United States Patent [19]

Pelletier

[11] Patent Number: 4,704,502
[45] Date of Patent: Nov. 3, 1987

[54] SUSPENSION ASSEMBLY FOR ELECTRICITY POWER SUPPLY RAILS

[75] Inventor: Yves Pelletier, Les Mureaux, France
[73] Assignee: C. Delachaux, Gennevilliers, France
[21] Appl. No.: 738,585
[22] Filed: May 28, 1985
[30] Foreign Application Priority Data May 30, 1984 [FR] France ................ 84 08543

[51] Int. Cl.⁴ .............................. B60M 1/34
[52] U.S. Cl. ................................ 191/23 A
[58] Field of Search ............. 191/23 R, 23 A, 32, 191/45 A; 211/113; 248/62, 68.1, 214, 317, 323

[56] References Cited

U.S. PATENT DOCUMENTS

| 2,912,526 | 11/1959 | Hermann et al. | 191/23 A |
| 3,624,318 | 11/1971 | Rekers | 191/23 A |
| 4,050,555 | 9/1977 | Ross, Jr. | 191/23 A |
| 4,220,229 | 9/1980 | Wampfler | 191/23 A X |

FOREIGN PATENT DOCUMENTS

| 681913 | 9/1939 | Fed. Rep. of Germany | 248/68 |
| 1202816 | 10/1965 | Fed. Rep. of Germany | 191/23 A |
| 1314840 | 12/1962 | France | 191/32 |
| 396138 | 1/1966 | Switzerland | 191/23 A |
| 952164 | 3/1964 | United Kingdom | 248/68 R |

Primary Examiner—Robert B. Reeves
Assistant Examiner—Charles Barrett
Attorney, Agent, or Firm—Fiddler & Levine

[57] ABSTRACT

An assembly for suspending electricity power supply rails comprising a cross member (2), bolts (6) or the like for fixing the cross member to a fixed structure (4) in a direction which is perpendicular to the direction of the power supply rails (8), and members for suspending the rails from the cross member. The members for suspending the rails comprise: a series of at least two generally T-shaped half-clamp elements (10) comprising a crossbar (12) and a riser (14) perpendicular to said crossbar (12), with the length of the crossbars corresponding to the spacing between centers of two adjacent power supply rails (8) or to a multiple of the spacing, with the riser (14) of each T shape including a hooking rim (16) on opposite rail engaging faces. A slidable connection is formed between each T-shaped element (10) and the cross member (2) and locking elments (20,22) are provided to lock the endmost T-shaped elements (10e) of the series against translation.

2 Claims, 3 Drawing Figures

SUSPENSION ASSEMBLY FOR ELECTRICITY POWER SUPPLY RAILS

The present invention relates to a suspension assembly for electricity power supply rails.

More precisely, the invention relates to mounting overhead power supply rails for moving electric vehicles and devices, the mounting being of the type which comprise a suspension support and at least one clamp fixed to said support and intended to retain a rail suspended therefrom; said rail is usually constituted by a metal section bar which is almost completely enclosed in a insulating sheath.

BACKGROUND OF THE INVENTION

Clamp mountings of this type are already known and comprise a one-piece cross member including a plurality of suspension clamps. In profile each clamp is shaped like a horseshoe. The ends of the arms of the horseshoe have inwardly directed rims intended for retaining the rail. The cross member is fixed to any convenient fixed structure, and specific examples of this kind of embodiment are to be found in published German patent specification No. 2 453 754.

This clamp mounting constitutes the closest prior art to the invention in that it comprises a cross member which is perpendicular to the rail direction and which supports a plurality of clamps or rail-fixing members.

In addition, other mountings are commonly used which do not include a cross member and in which single clamps are directly fixed to a fixed structure by screw means constituted by a threaded rod and a nut.

Some such single clamps are made from one piece of metal or plastic; others are made from two or three parts which are assembled by screws or bolts, as described in published French patent specification No. 2 185 838.

Finally, it should be observed that a clamp may be used to fix not just a single rail, but also a plurality of rails inserted in a single sheath.

All the clamp assemblies described above suffer from various drawbacks.

A first drawback relates to the fixing of the clamp assembly to the fixed structure. In the prior art, as mentioned above, such fixing is constituted by a threaded rod co-operating with a nut.

In a mounting which includes a single clamp, it will readily be understood that there must be as many fixing points as there are clamps. The time taken to mount the clamps is thus rather long. Additionally, the screw means used for fixing are generally made of stainless steel and are thus rather expensive. Further, other drawbacks result from the difficulty of accurately placing fixing holes in a fixed structure. As a result the rails are not completely parallel.

Finally, known clamp mountings are difficult to properly align with the rail direction since they tend to pivot about the axis of the fixing rod. This results in a twisting phenomenon which causes stress to be applied to the power supply rails.

Another drawback of the prior art concerns the placing and locking of the rails themselves in the suspension clamps.

Some clamps, as explained above, need to be opened in order to insert the rail and then closed by means of screws or bolts. In such cases, it takes a long time to install a rail because of a very large number of screws that need to be tightened.

When the rails are inserted in clamps having resilient arms, it is true that less time is required to install the rails, however the rails are not held in a secure manner. That is why this method of fixing can only be used with lightweight rails.

In other cases, the clamps are fitted over an end of the rail and must then be slid along the length thereof, i.e. several meters, up to their mounting positions; such assembly takes a long time.

Preferred embodiments of the present invention remedy these various drawbacks and propose a clamp mounting assembly which may be rapidly fixed to a fixed structure, and whose angular orientation may be easily and acurately adjusted; in addition, the fixing cost is not very great, and the power supply rails are rapidly installed and are retained in a secure manner.

SUMMARY OF THE INVENTION

The present invention provides an assembly for suspending electricity power supply rails, the assembly comprising:

a cross member;

fixing means for fixing said cross member to a fixed structure in a direction which is perpendicular to the direction of the power supply rails; and members for suspending the rails from said cross member;

the assembly including the improvement whereby said members for suspending the rails comprise:

a series of at least two generally T-shaped half-clamp elements, each comprising a crossbar and a riser perpendicular to said crossbar, with the crossbar length corresponding to the spacing between centers of adjacent power supply rails or to a multiple of said spacing, and with each T-shaped element riser including a hooking rim on each of two opposite rail-engaging faces;

means for slidably connecting each T-shaped element to the said cross member; and means for locking the endmost T-shaped elements in said series against translation motion.

With such an assembly, rail mounting is made considerably easier. Firstly, the T-shaped elements are quickly and easily installed on the cross member since the length of said cross member is only a few tens of centimeters. Subsequently, the rails are quickly installed between the T-shaped elements. The T-shaped elements are moved apart and then back together again merely by sliding them along a slideway in the cross member. Mounting is also made easier since only two fixing screws in total need tightening regardless of the number of rails. All these reasons contribute to reducing mounting time.

The spacing between centers of parallel rails is determined by the length of the crossbars of the T-shaped elements, and not by the accuracy with which the clamps are fixed to the fixed structure. Given that the T-shaped elements are easily manufactured to a high degree of accuracy, the spacing between rails centers is indeed constant.

During mounting, the T-shaped elements are freely slidable along the cross member. They therefore take up natural positions relative to the rails without stressing or deforming the rails.

In a series of parallel rails, two adjacent rails are separated solely by the thickness of the riser of a T-shaped element, in other words, by a single wall. The rails can thus readily be placed close to one another and the overall size of the assembly is reduced. In addition, since the rails are closer to one another, the impedance of a multiphase line is reduced. Consequently, in-line voltage drops are low.

The cross member fixed to a fixed structure is fairly easily oriented in a direction which is accurately perpendicular to the rail direction. The T-shaped elements which are guided in the slideway of said cross member are thus likewise properly positioned relative to the rails. The above-mentioned risk of twisting therefore does not exist.

The cross member may naturally be used directly as a bracket; in this case it will be longer and it will be directly fixed to a fixed structure.

The reduction in the number of fixing screws contributes to reducing the cost. Prior art suspension clamps frequently include expensive stainless steel fixing means. Construction price is thus reduced. Finally, the gap between two half-clamps in accordance with the invention is predetermined, thereby predetermining rail clamping and allowing for rail expansion.

BRIEF DESCRIPTION OF THE DRAWINGS

An embodiment of the invention is described by way of example with reference to the accompanying drawings, in which.

DESCRIPTION OF PREFERRED EMBODIMENT

Figure 1:
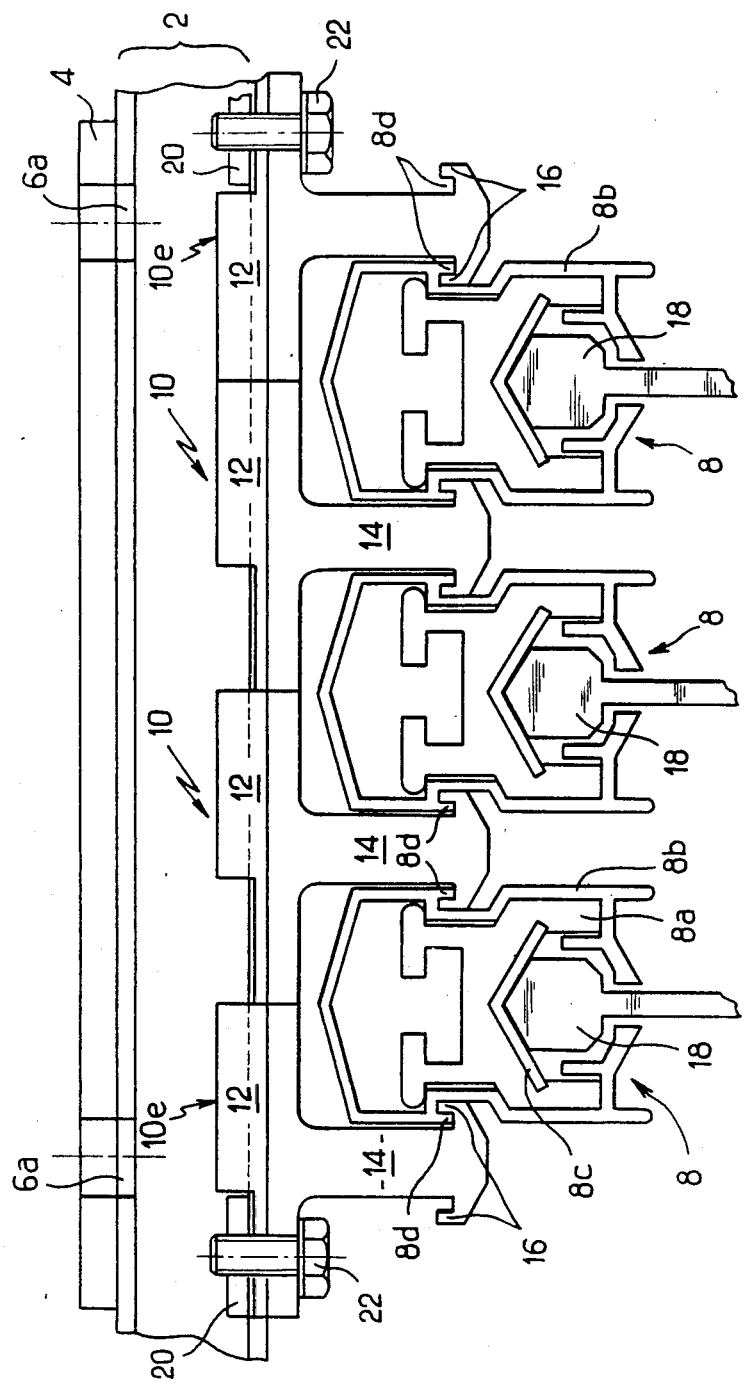
FIG. 1 is a diagram of a suspension clamp assembly and its mounting in accordance with the present invention; the view is taken perpendicularly to the rails on a section I—I of FIG. 2, and the clamps are not shown in section.
Figure 2:
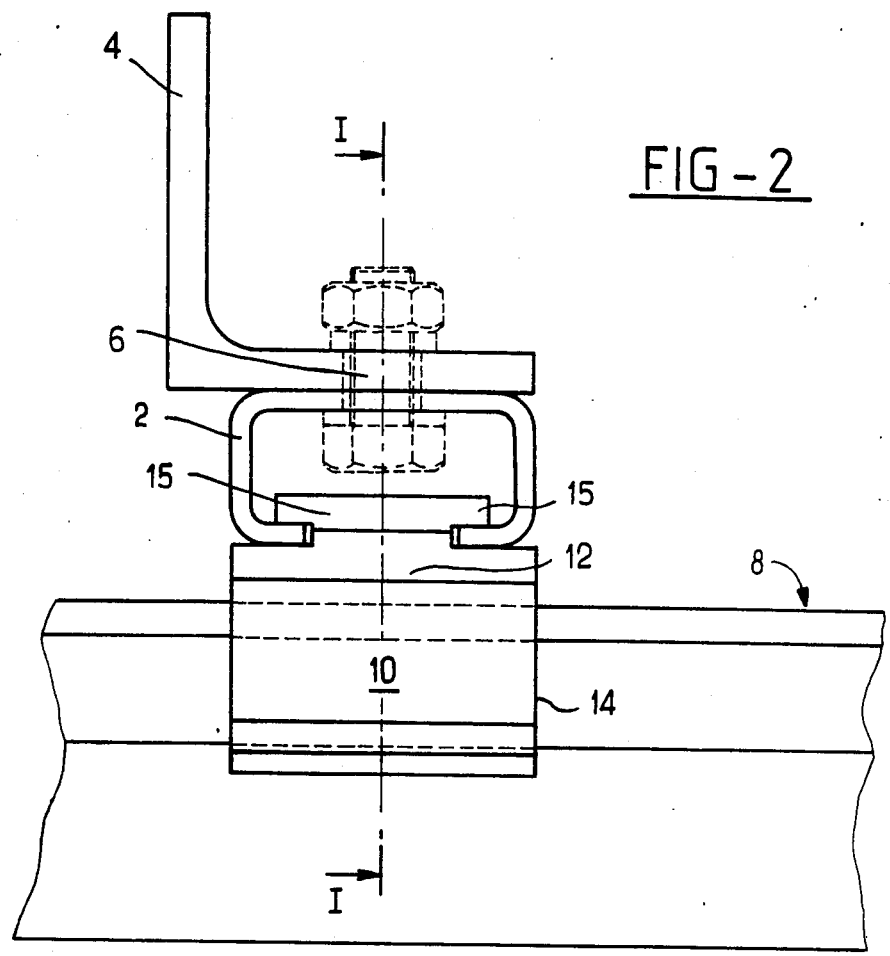
FIG. 2 is a diagrammatic side view taken parallel to the rails and showing how the FIG. 1 clamps are mounted.

The mounting of the suspension clamps shown in FIGS. 1 and 2 includes a cross member 2. This cross member is fixed to a fixed structure (not shown) which may be constituted, for example, by a gantry, a bracket, or the ceiling, and it is fixed thereto by an angle iron 4 which constitutes a part of said fixed structure. The cross member is fixed to the angle iron perpendicularly to the conductor rail direction by means of two bolts 6. The cross member is provided with side windows 6a level with the bolt locations to enable a bolt-tightening tool to pass therethrough. In end view (FIG. 2) the cross member has a C-shaped cross section with the slot facing downwards. The length of the cross member is determined as a function of the number of T-shaped elements which it is intended to support, said number being in turn determined by the number of conductor rails to be installed. Further, the cross member 2 may serve to support additional equipment. The length of the cross member makes it possible to have a relatively large space between the fixing holes for the bolts 6, thereby making it possible to orient the member perpendicularly to the rail direction to a high degree of accuracy with little difficulty.

Figure 3:
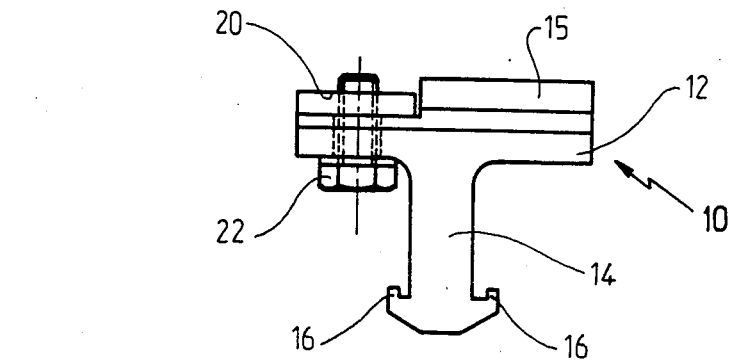
FIG. 3 is a side view of T-shaped element constituting the end suspension clamp (at one end of the assembly) shown in FIGS. 1 and 2.

As shown in the drawings, and particularly in FIG. 3, each T-shaped element comprises a crossbar 12 and a riser 14 which is perpendicular to the crossbar 12. In the example described the elements 10 are made of Macrolon 6030 ®, which is a rigid polycarbonate. Sliding connection means between the element 10 and the cross member 2 are formed on the crossbar 12. These connection means are constituted by a cap 15 in the form of a flat T, made in one piece with the remainder of the element 10, and having its arms extending at right angles to the arms of the crossbar 12. The cap 15 is slidably engaged in the slot of the cross member 2 by means of its ends. Given that the cross member is not very long this operation is very quick. Two hooking rims 16 are provided at the bottom end of the riser 14 on either side thereof. The rims 16 are intended to co-operate with a conductor rail which could be made of copper but which, in the example shown, is constituted by an aluminum core 8a surrounded by an insulating sheath 8b of plastic material and having a stainless steel inverted V-shaped rubbing strip 8c inserted therein. The insulating sheath 8b insulates the conductor from the fixed structure and avoids any risk of electrocution. For increased safety, lips provided at the bottom of the insulating sheath prevent contact with the conductive portion of the rail. A shoe 18 shown diagrammatically in FIG. 1 is engaged between the lips of the sheath. The shoe is pressed against the rubbing strip 8c whose V-shape ensures proper centering.

In FIG. 1, four elements 10 are fixed to the cross member 2 in order to suspend three rails 8, but more could be provided. For example, six conductor rails could be suspended using seven elements. The elements 10 meet one another and they are pressed against one another. The length of the crossbar 12 in the longitudinal direction of the cross member 2 is determined as a function of the width of the rails 8 in such a manner that when the elements 10 abut against one another, the spacing between the rails is properly adjusted. It may be observed that the rails are separated solely by the thickness of the risers 14. The rails may thus be disposed at a close spacing, e.g. at 50 mm centers, for a current of 1000 A.

Only the end elements situated to the left and the right of the series of T-shaped elements are locked to the cross member 2. Each of these elements are fixed by means of a screw 22 and a plate 20 which acts as a nut and which is wider than the slot through the cross member 2. The cap 15 also serves to prevent the plate 20 from rotating.

It may be observed that all of the elements 10 in the series fixed to the cross member are identical. The element 10e to the right of FIG. 1 is simply reversed prior to being slid onto the cross member. The two elements 10 situated between the end elements 10e include respective holes passing therethrough to receive respective screws, but the holes are not used, which does not matter. It is easier to manufacture only one type of element.

The rails 8 are installed quite simply by moving the elements far enough apart to enable a rail to be inserted between risers 14, and then moving the elements closer together so as to engage the hooking rims 16 with complementary rims 8d provided in the rail sheaths. Before the screws 22 are tightened, the elements 10 may slide freely along the cross member 2. They thus align themselves on the rails 8. Regardless of the number of rails, only two screws need to be tightened, thereby saving time. The rails are tightened to a predetermined side so as to allow for expansion.

Naturally, the invention is not limited to the element described, but extends to any variant in accordance with the spirit of the invention.

I claim:

1. An assembly for suspending electricity power supply rails having opposed hook engaging edges, said assembly comprising: a cross member, fixing means for fixing said cross member to a fixed structure in a direction which is perpendicular to the direction of the power supply rails, a series of T-shaped suspension elements slidably mounted on said cross member, each suspension element of said series comprising a crossbar and a riser perpendicular to said cross bar, the crossbar length equal to the spacing between the center lines of adjacent power supply rails to be supported, and an upwardly extending hooking rim on the lower end of each T-shaped element riser on each of two opposite rail-facing faces, so that a power supply rail mounted between two adjacent T-shaped elements is stabilized in a hooked position without being pressed, and each T-shaped element crossbar includes a locking arrangement cooperating with locking means when said T-shaped element is an end element of said series, said locking arrangement comprising: a recess formed in the upper surface of the crossbar of said T-shaped element and a hole extending through said crossbar from said recess through to a bottom surface of said crossbar, and said locking means comprise a screw-retaining plate located in said recess and a screw cooperating with said plate and passing through said hole.

2. An assembly according to claim 1, including means for slidably connecting each T-shaped element to said cross member, said means comprising a cap fixed to the crossbar of each T-shaped element, slidably engageable in a slideway dimensioned to receive said cap formed in said cross member.

* * * * *